(12) United States Patent
Scott et al.

(10) Patent No.: US 7,981,535 B2
(45) Date of Patent: Jul. 19, 2011

(54) BATTERY PACKAGING SYSTEM

(75) Inventors: Jason Scott, Webster, NY (US);
Timothy D. Rountree, East Rochester, NY (US); Joshua Storm Gannon, Fairport, NY (US); Michael Stevens, Avon, NY (US)

(73) Assignee: Harris Corporation, Melbourne, FL (US)

( * ) Notice: Subject to any disclaimer, the term of this patent is extended or adjusted under 35 U.S.C. 154(b) by 559 days.

(21) Appl. No.: 12/199,000

(22) Filed: Aug. 27, 2008

(65) Prior Publication Data

US 2010/0055550 A1 Mar. 4, 2010

(51) Int. Cl.
*H01M 2/10* (2006.01)
*H01M 6/46* (2006.01)
*H01M 2/00* (2006.01)

(52) U.S. Cl. ........... 429/100; 429/96; 429/162; 429/163

(58) Field of Classification Search .................... 429/96, 429/100, 162, 163, 164, 174, 183; 381/312, 381/322
See application file for complete search history.

(56) References Cited

U.S. PATENT DOCUMENTS

| | | | | |
|---|---|---|---|---|
| 3,945,193 A * | 3/1976 | Yasuda et al. | ................... | 368/88 |
| 4,453,833 A * | 6/1984 | Saitoh | ............................. | 368/88 |
| 4,487,820 A * | 12/1984 | Engelstein et al. | .......... | 429/100 |
| 4,848,568 A | 7/1989 | Eckelman | | |
| 4,992,987 A | 2/1991 | Echols et al. | | |
| 5,188,912 A * | 2/1993 | Katoh et al. | ..................... | 429/96 |
| 5,654,111 A * | 8/1997 | Minomiya et al. | ............ | 429/162 |
| 5,805,423 A * | 9/1998 | Wever et al. | .................. | 361/760 |
| 6,218,044 B1 | 4/2001 | Suzuka et al. | | |
| 7,390,215 B2 * | 6/2008 | Liao et al. | ..................... | 439/500 |
| 2002/0022176 A1 * | 2/2002 | Aw et al. | ....................... | 429/100 |
| 2004/0121226 A1 * | 6/2004 | Kaelin et al. | ................... | 429/96 |
| 2010/0047677 A1 | 2/2010 | Ornt | | |

* cited by examiner

*Primary Examiner* — Jennifer K. Michener
*Assistant Examiner* — Carlos Barcena
(74) *Attorney, Agent, or Firm* — Fox Rothschild, LLP; Robert J. Sacco

(57) ABSTRACT

A battery holder assembly (219) includes a cavity structure (CS), a screw plate (SP), a spring electrical contact (SEC), an insulator cup (IC), and a pin (402). CS (392) defines a cavity (210) in a chassis panel (CP) of an electronic device (ED). SP (320) snugly fits within an opening in CP (212). SP has a base (702) forming a cover for enclosing the cavity. SP forms a connection with CS and a first terminal of a battery (318), when battery is positioned in the cavity and SP is fitted within the opening. SEC (802) provides a connection between battery and SP. IC (322) snugly receives battery therein. IC fits within the cavity and electrically insulates a second terminal of battery from CS. A battery contact (BC) is disposed on IC. BC (716, 412) provides a connection to the second terminal. Pin forms a connection between BC and ED.

23 Claims, 8 Drawing Sheets

BATTERY PACKAGING SYSTEM

BACKGROUND OF THE INVENTION

1. Statement of the Technical Field

The invention concerns battery packaging systems. More particularly, the invention concerns low profile hold up battery packaging systems for use in a variety of electronic devices having various internal configurations.

2. Description of the Related Art

Electronic devices which comprise internal circuit components are typically powered by external primary batteries. These external primary batteries are often housed in a battery compartment of the electronic device in a manner enabling an electrical connection between the battery and the internal circuit components. However, it is increasingly desirable to provide these internal circuit components with a back-up battery. The back-up battery can generally be provided for assuring continued retention of stored information in the event of a power loss from the primary power source.

The back-up battery may be housed in a battery package system configured to be coupled to the electronic device. Despite the advantages of the conventional battery packaging systems, they suffer from drawbacks. For example, the conventional battery packaging systems often have a relatively large profile. The conventional battery packaging systems are typically not designed to provide an environmental seal to two (2) meters below the surface of the water. The conventional battery packaging systems are typically not designed to be used with electronic devices having a variety of internal configurations. The conventional battery packaging systems have relatively complicated assemblies.

In view of the forgoing, there is a need for a battery packaging system having a low profile and a relatively easy assembly. The battery packaging system shall provide an environmental seal to two (2) meters below the surface of the water. The battery packaging system shall have the capability to be used with electronic devices having a variety of internal configurations.

SUMMARY OF THE INVENTION

The present invention concerns a battery holder assembly for an electronic device. The battery holder assembly is comprised of a cavity structure, a screw plate, a spring electrical contact, an insulator cup, a battery, and a pin. The cavity structure is disposed in a chassis panel of the electronic device. The cavity structure defines a cavity. The cavity structure is at least partially formed of an electrically conductive material.

The screw plate is at least partially formed of an electrically conductive material sized and shaped to be snugly fitted within an opening in the chassis panel defined by the cavity structure. The screw plate has a base which forms a cover for enclosing the cavity. The screw plate is configured to form an electrical connection with the cavity structure and a first terminal of a coin cell battery, when the battery is positioned in the cavity and the screw plate is fitted within the opening. At least one slot or notch is disposed on a surface of the screw plate for receiving a tool.

The spring electrical contact is disposed on an inner face of the screw plate. The spring electrical contact is configured for providing an electrical connection between the battery disposed in the cavity and an inner face of the screw plate.

The insulator cup is formed of an electrically insulating material. The insulator cup is sized and shaped for snugly receiving the coin cell battery therein. The insulator cup is configured to fit within the cavity. The insulator cup is also configured to electrically insulate a second battery terminal of a coin cell battery when positioned therein from the cavity structure. A battery contact is disposed on the insulator cup. The battery contact is formed of an electrically conductive material configured for providing an electrical connection to a second terminal of the coin cell battery when the coin cell battery is positioned in the cavity. The pin is formed of a conductive material. The pin forms an electrical connection extending between the battery contact on the insulator cup and a circuit board of the electronic device.

According to an aspect of the invention, the pin is comprised of a pogo pin having at least one movable end which is resiliently biased for movement in a direction aligned with an axis of the pin. The movable end of the pin is configured to resiliently engage the battery contact on the insulator cup when the circuit board is secured adjacent to the chassis panel.

According to another aspect of the invention, the screw plate is comprised of a peripheral side wall with threads disposed thereon. The threads are configured for threaded engagement with a threaded sidewall of the cavity structure. A gasket is disposed within the cavity structure. The gasket is positioned to engage an edge of the peripheral sidewall opposed from the base. The gasket provides a seal between the screw plate and the cavity structure. The seal excludes the entry of environmental contaminants through the cavity and into the electronic device.

According to another aspect of the invention, the insulator cup is comprised of one or more clips integrally formed with the insulator cup. The clips are configured for securing a coin cell battery in the insulator cup when positioned therein. The insulator cup is further comprised of a bushing which projects from a base thereof. The bushing extends through an aperture formed in the cavity structure opposed from the screw plate. The bushing has a bore defined therein configured for receiving the pin. A flange is disposed on the bushing. The flange is configured for engaging a securing clip. The securing clip is configured to secure the insulator cup in the cavity structure.

BRIEF DESCRIPTION OF THE DRAWINGS

Embodiments will be described with reference to the following drawing figures, in which like numerals represent like items throughout the figures, and in which.

DETAILED DESCRIPTION OF THE PREFERRED EMBODIMENTS

Embodiments of the present invention will now be described with respect to FIGS. 1-9. Embodiments of the present invention relate to battery packaging systems. More particularly, the invention concerns low profile battery packaging systems for use in a variety of electronic devices having various internal configurations. Such electronic devices can include, but are not limited to, radios, mobile telephones, cellular telephones, video cameras, recording devices, digital cameras, sensors, and other electronic devices. Embodiments of the battery packaging systems have relatively easy assemblies as compared to conventional battery packaging systems. Embodiments of the battery packaging systems are environmentally sealed to at least two (2) meters below the surface of the water. Embodiments of the battery packaging systems are designed to meet the MIL-STD-810F environmental standards. The MIL-STD-810F environmental standards are well known to those having ordinary skill in the art, and therefore will not be described herein. However, it should be understood that battery packaging systems can operate under harsh environmental conditions. Embodiments of the battery packaging systems are easily replaceable using conventional rotational driving tools (e.g., watch tool drivers, screw drivers, and pocket knifes) and/or coins.

Before describing the battery packaging systems of the present invention, it will be helpful in understanding an exemplary environment in which the invention can be utilized. In this regard, it should be understood that the battery packaging systems of the present invention can be utilized in a variety of different applications where back-up batteries are needed for powering circuit components of an electronic device in the event of a power loss from the primary power source. Such applications include, but are not limited to, radio applications, mobile/cellular telephone applications, visual/audio recording applications, camera applications, sensor applications, and other military/commercial electronic device applications.

Figure 1:
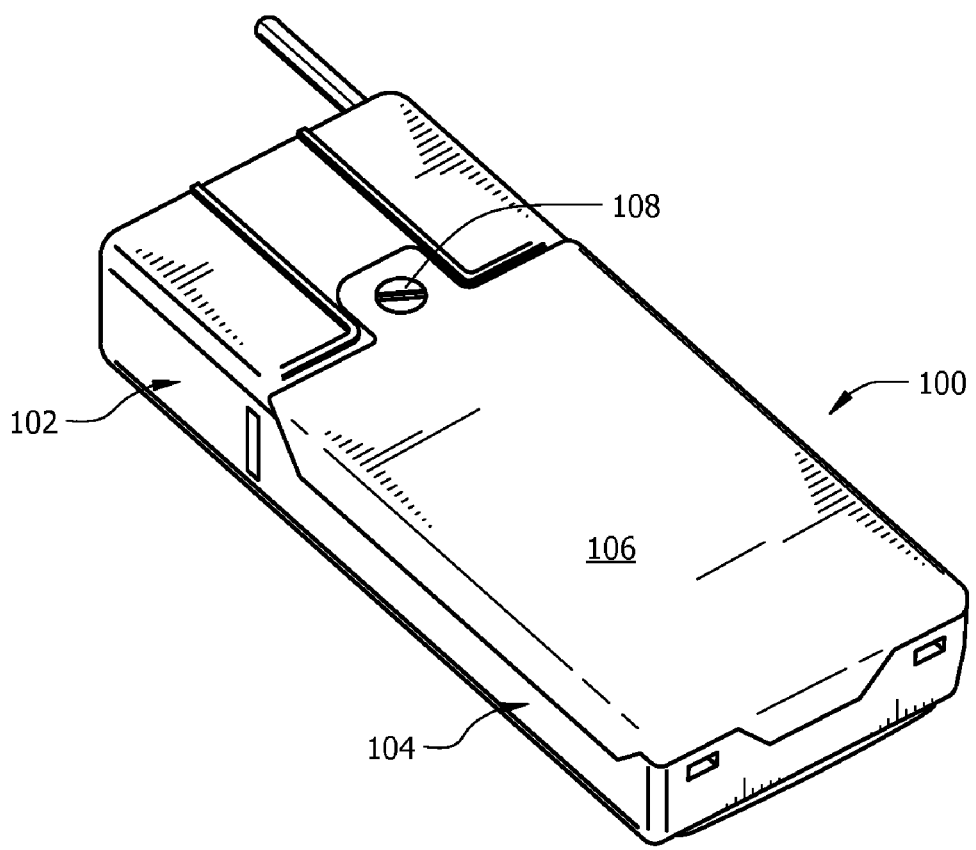
FIG. 1 is a perspective view of an exemplary communication device that is useful for understanding the present invention.

Referring now to FIG. 1, there is provided an electronic device 100 that is useful for understanding the present invention. Although electronic device 100 is shown to be a radio, the invention is not limited in this regard. For example, electronic device 100 can be a radio, a mobile telephone, a cellular telephone, a video camera, a recording device, a camera, a sensor, or any other electronic device. As shown in FIG. 1, electronic device 100 is generally comprised of a housing 102 configured to house circuits (not shown), batteries (not shown), and other electronic components (not shown). Housing 102 can be formed from any conductive material, such as a metal material.

Housing 102 is comprised of a main body 104 and a battery cover 106 coupled to the main body 104 via a mechanical connector 108. Battery cover 106 is a removable component facilitating the insertion of a primary battery (shown in FIG. 2) and a hold-up battery (not shown) into electronic device 100. Battery cover 106 also facilitates the removal of the batteries (not shown) from electronic device 100. This battery removal is accomplished by the de-coupling of the battery cover 106 from the electronic device 100. As a result of the battery cover de-coupling, a user (not shown) has access to the batteries (not shown) for removal of the same.

Figure 2:
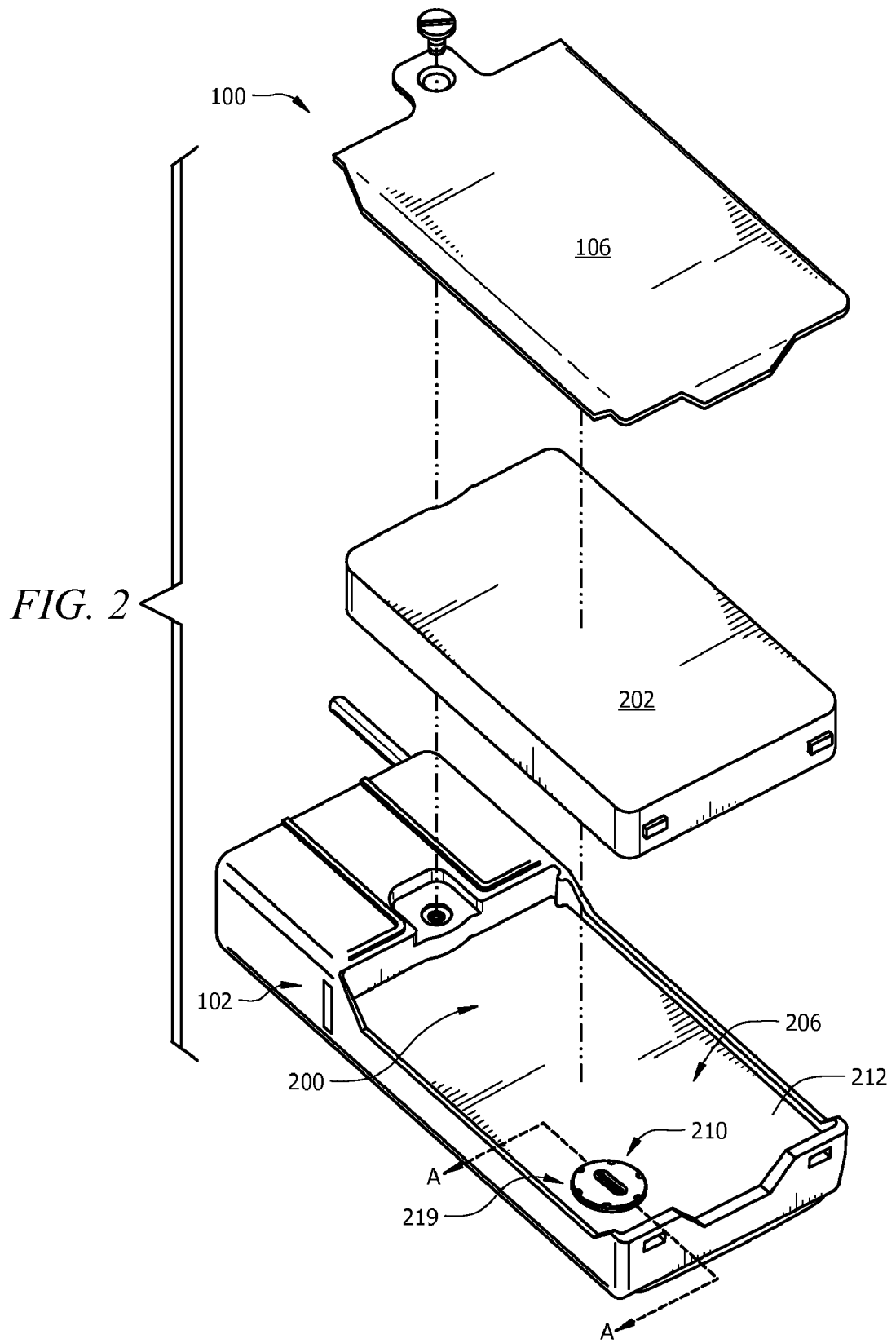
FIG. 2 is a perspective view of the communication device of FIG. 1 with a battery cover and a primary battery removed therefrom.

Referring now to FIG. 2, there is provided a perspective view of the electronic device 100 having the battery cover 106 and a primary battery 202 removed therefrom. The primary battery 202 is provided for supplying power to internal circuitry (not shown) during normal operations of the electronic device 100. A hold-up battery is generally provided for powering circuit components (not shown) of the electronic device 100 in the event of a power loss from or the removal of the primary battery 202. The hold-up battery is provided in a chassis panel, which in this case is a bottom wall 212 of a battery compartment 206 within a battery holder assembly 219. The invention is not limited in this regard. For example, the battery holder assembly 219 can be provided in any suitable portion of the electronic device 100, provided that an electrical connection can be made as hereinafter described between internal circuitry (not shown) of the electronic device 100 and the hold-up battery.

Figure 3:
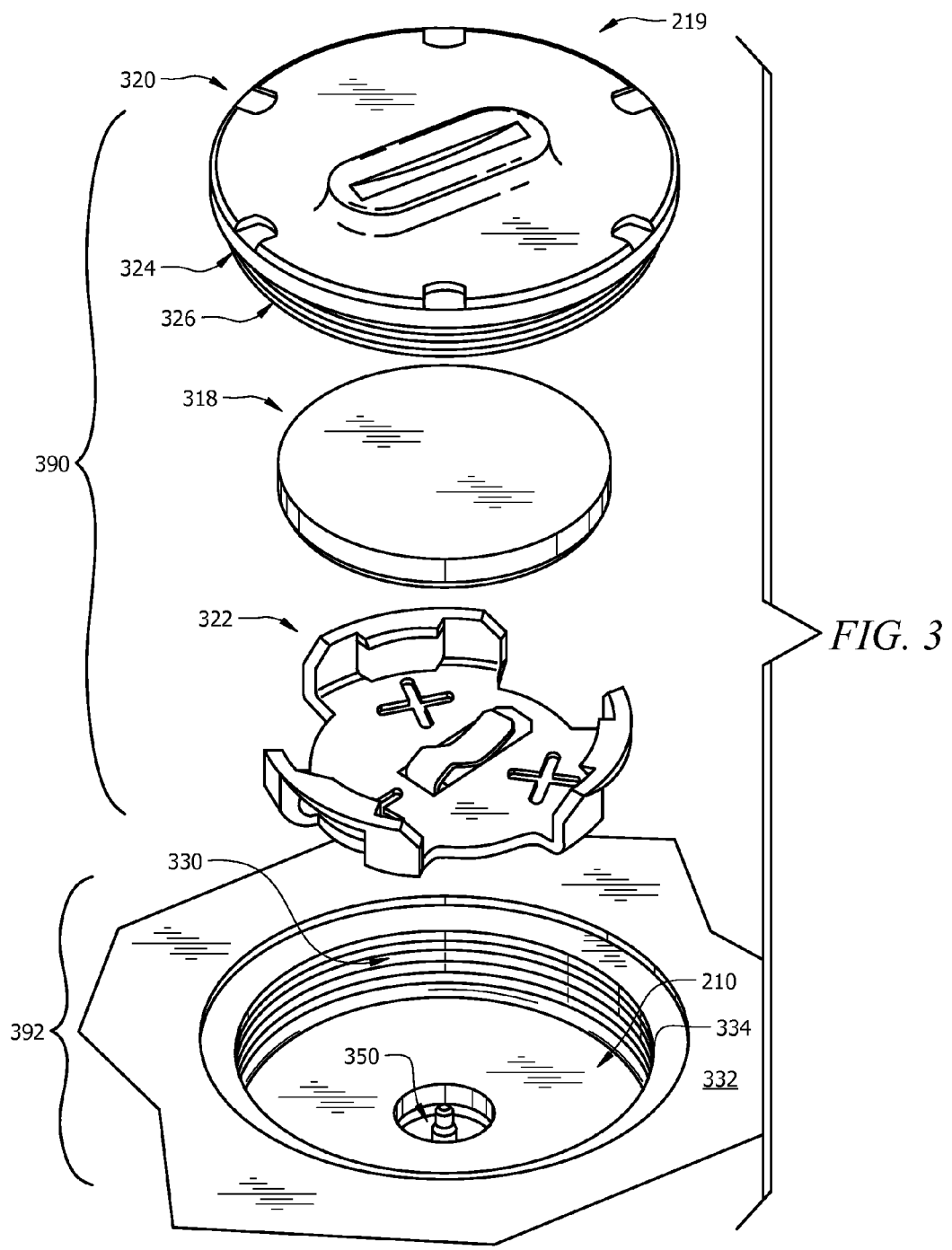
FIG. 3 is an exploded view of a portion of the communication device that is useful for understanding the present invention.

Referring now to FIG. 3, there is provided an exploded view of a portion of the communication device 100. As shown in FIG. 3, the battery holder assembly 219 comprises a battery assembly 390 and a chassis assembly 392. The battery assembly 390 is comprised of a screw plate 320, an insulator cup 322, and a battery 318. Each of these components 320, 322, 318 will be described below in relation to FIGS. 4-9. However, it should be noted that the screw plate 320 comprises a sidewall 326 with threads 324 formed thereon. The threads 324 of screw plate 320 are configured to threadingly engage threads 330 formed in a sidewall 334 defining cavity 210 of chassis assembly 392. The threaded engagement facilitates the retention of screw plate 320 within cavity 210. It should also be noted that the screw plate 320 and sidewall 334 of cavity 210 are formed of an electrically conductive material. In effect, an electrical connection can be established between battery 318 and a chassis 332 for grounding the same.

Figure 4:
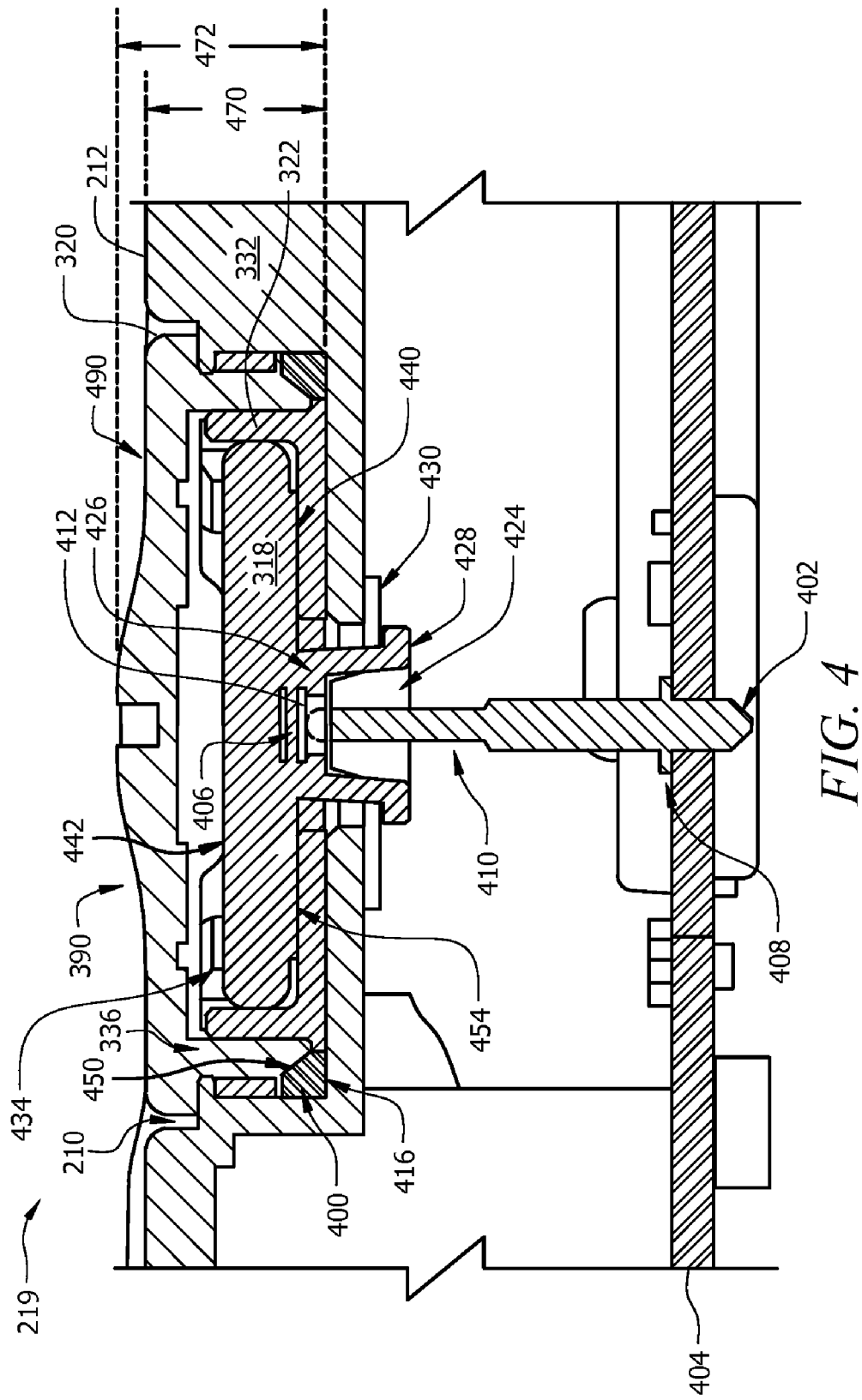
FIG. 4 is a cross sectional view of a portion of the communication device taken along line 4-4 of FIG. 2.

Referring now to FIG. 4, there is provided a cross sectional view of the portion of the electronic device 100 taken along line 4-4 of FIG. 2. As shown in FIGS. 3-4, cavity 210 has a gasket 400 disposed therein. Gasket 400 provides a seal which prevents an intrusion of water and dust into an interior of cavity 210. The seal is formed between an edge of screw plate 320 and a bottom wall 416 of cavity 210. In this regard, it should be understood that the sidewall 336 of screw plate 320 comprises a chamfered edge 450 configured for facilitating the establishment of the seal by engaging gasket 400 so as to compress the gasket 400 against the surrounding structure.

According to an embodiment of the invention, gasket 400 is a continuous molded o-ring gasket formed of silicone rubber having a hardness between forty (40) and ninety (90) durometers. The invention is not limited in this regard. Gasket 400 can be formed of any type or material selected in accordance with a particular electrical connector application.

It should be noted that cavity 210 includes an internal bore 350 (shown in FIG. 3) which provides access to an interior of the electronic device 100. More particularly, the internal bore 350 (shown in FIG. 3) enables the protrusion of at least a portion of an electrically conductive pin 402 into cavity 210 (as shown in FIG. 3). Electrically conductive pin 402 is generally configured to electrically connect a hold-up battery 318 to a hold-up battery circuit (not shown) printed on a printed circuit board 404 disposed within electronic device 100. As such, a first end 408 of the electrically conductive pin 402 is coupled to the printed circuit board 404 at a location in which an electrical connection between the pin 402 and a positive power supply line (not shown) of the hold-up battery circuit (not shown) is established. A second end 410 of the electrically conductive pin 402 comprises a contact surface 406 configured for engaging an electrically conductive contact 412 of the battery assembly 390.

Electrically conductive pin 402 can be a generally cylindrically shaped pin having a tip end that can be resiliently biased toward a battery for resiliently engaging a contact of the hold-up battery 318. For example, the electrically conductive pin 402 can comprise a pogo pin available from Interconnect Devices, Inc., of Kansas City, Kans. The pogo pin includes a contact surface 406 on one of two (2) opposing ends. The pogo pin also includes a chamber with a spring disposed therein. When the pogo pin is actuated, a movable end is reliantly biased for movement in a direction aligned with an axis of the pin. In effect, the spring is compressed and the length of the pogo pin is decreased. The invention is not limited in this regard.

Referring again to FIG. 4, the screw plate 320 has a height 472 that is substantially similar to the height 470 of cavity 210. Heights 472, 470 can be selected in accordance with any electronic device application. According to an embodiment of the invention, heights 470, 472 are selected to have values falling within the range of half inch to a twentieth of an inch (0.5"-0.20"). Screw plate 320 can be sized and shaped so that top peripheral surface 490 is generally flush with a bottom wall 212 of battery compartment 206 (described above in relation to FIG. 2) when screw plate 320 is fully inserted into cavity 210. The invention is not limited in this regard. Screw plate 320 will be described in further detail below in relation to FIGS. 6-9.

As shown in FIG. 4, insulator cup 322 and battery 318 are disposed within screw plate 320 when the screw plate is fully inserted within cavity 210. Insulator cup 322 is disposed within cavity 210 and secured to electronic device 100 via bushing 426. Bushing 426 can be integrated with insulator cup 322 or can be a separate component coupled to insulator cup 322 via a coupling means (e.g., an adhesive). If bushing 426 is integrated with insulator cup 322, then it may be integrally molded with insulator cup 322 during an injection molding process. Injection molding processes are well known to those having ordinary skill in the art, and therefore will not be described herein. Any known injection molding process can be used to form the insulator cup 322 with bushing 426 integrated therewith.

As shown in FIG. 4, bushing 426 protrudes away from a bottom surface 454 of insulator cup 422. Bushing 426 has a flange 428 configured for engaging chassis clip 430. Chassis clip 430 is configured for securing the insulator cup 322 to the electronic device 100. Chassis clips are well known to those having ordinary skill in the art, and therefore will not be described herein.

Referring again to FIG. 4, bushing 426 has a central aperture 424 sized and shaped to receive the electrically conductive pin 402. Electrically conductive contact 412 is disposed within central aperture 424 for facilitating an electrical connection with the electrically conductive pin 402. The electrically conductive contact 412 extends through the insulator cup 322 to provide an electrical connection to battery 318.

Insulator cup 322 is formed of a dielectric material having a shape suitable for isolating a positive terminal 440 of battery 318 from a chassis 332 of the electronic device 100. Such dielectric materials include, but are not limited to, polymers, rubbers, and plastics. Insulator cup 322 is also sized and shaped for being snuggly received by a recess 434 formed in screw plate 320. Insulator cup 322 will be described in further detail below in relation to FIGS. 6-9.

Battery 318 is disposed within insulator cup 322 and the entire assembly is positioned within recess 434 of the screw plate 320. Accordingly, insulator cup 322 is sized and shaped to receive battery 318. Battery 318 can generally be a coin cell battery. Coin cell batteries are well known to those having ordinary skill in the art, and therefore will not be described herein. However, it should be understood that any coin cell battery can be used without limitation. It should also be understood that coin cell batteries typically have a diameter with a value falling within the range of five millimeters to thirty millimeters (5 mm-30 mm). Coin cell batteries also typically have a height with a value falling within the range of one millimeter to thirty millimeters (1 mm-30 mm). The invention is not limited in this regard. Battery 318 can be any known battery suitable for a particular electronic device application.

Referring again to FIG. 4, battery 318 comprises the positive terminal 440 and a negative terminal 442. Battery 318 is positioned within recess 434 so that an electrical connection between it's positive terminal 440 and the electrically conductive contact 412 is established. Battery 318 is also positioned within recess 334 so that an electrical connection between it's negative terminal 442 and screw plate 320 is established. Of course, it should be understood that the particular polarity of the battery is not critical to the invention.

Figure 5:
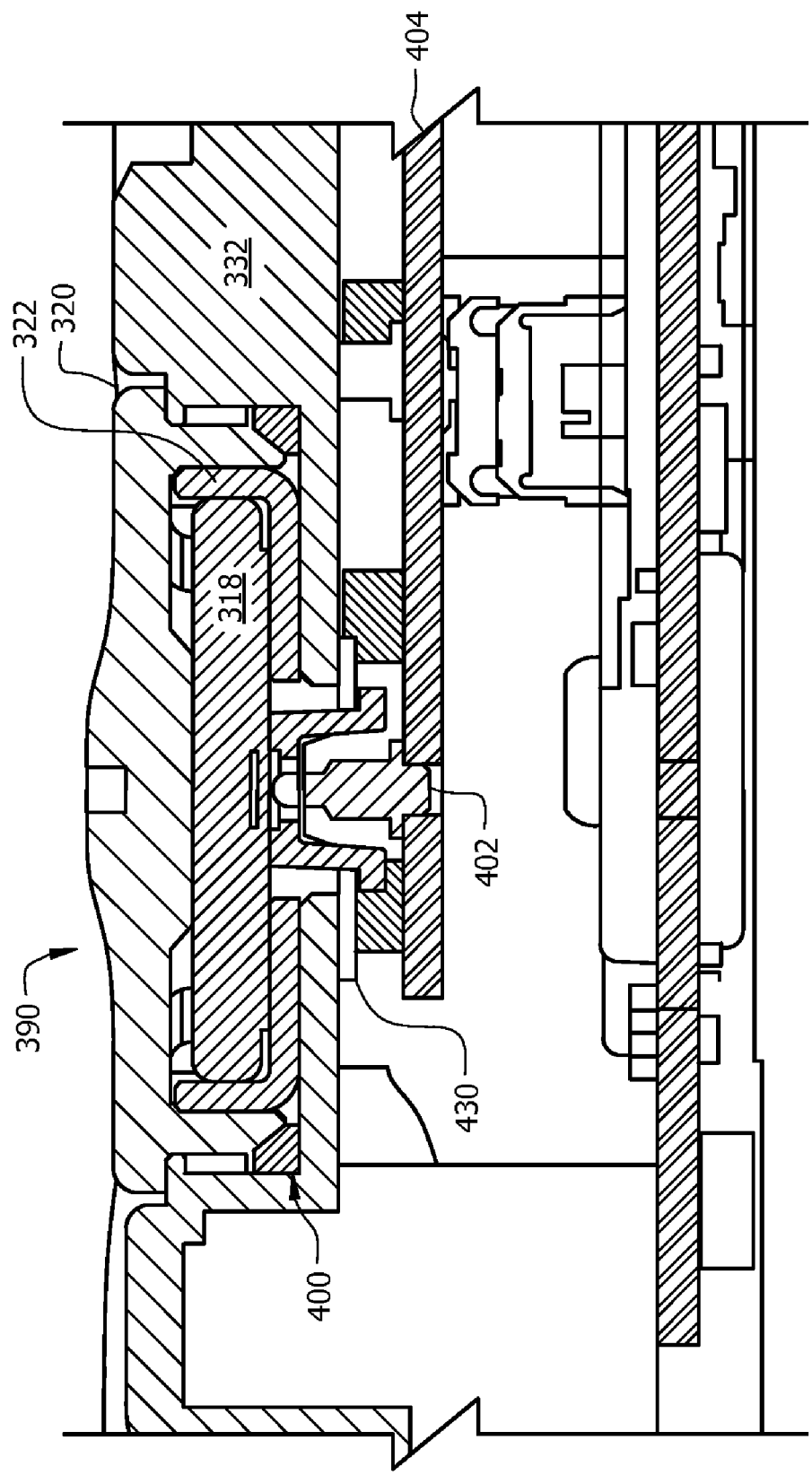
FIG. 5 is a schematic illustration of an alternative embodiment of an internal configuration of a communications device that is useful for understanding the present invention.

Referring now to FIG. 5, there is provided a schematic illustration of an alternative internal configuration of an electronic device that is useful for understanding the present invention. In FIGS. 4 and 5, common structure is identified using the same reference numbers whenever possible. In addition, it will be noted that in FIG. 5, a circuit board 404 is placed a smaller distance from the battery assembly 390. Likewise, a shorter pin 402 is used to form the connection from the battery assembly 390 to the circuit board 404. As can be observed from FIGS. 4 and 5, battery assembly 390 can advantageously be used in electronic devices having different internal configurations. These internal configurations can include electrically conductive pins of different types and sizes. These internal configurations can also include printed circuit boards having different sizes and locations within the electronic devices. Battery assembly 390 will now be described in detail in relation to FIGS. 6-9.

Figure 6:
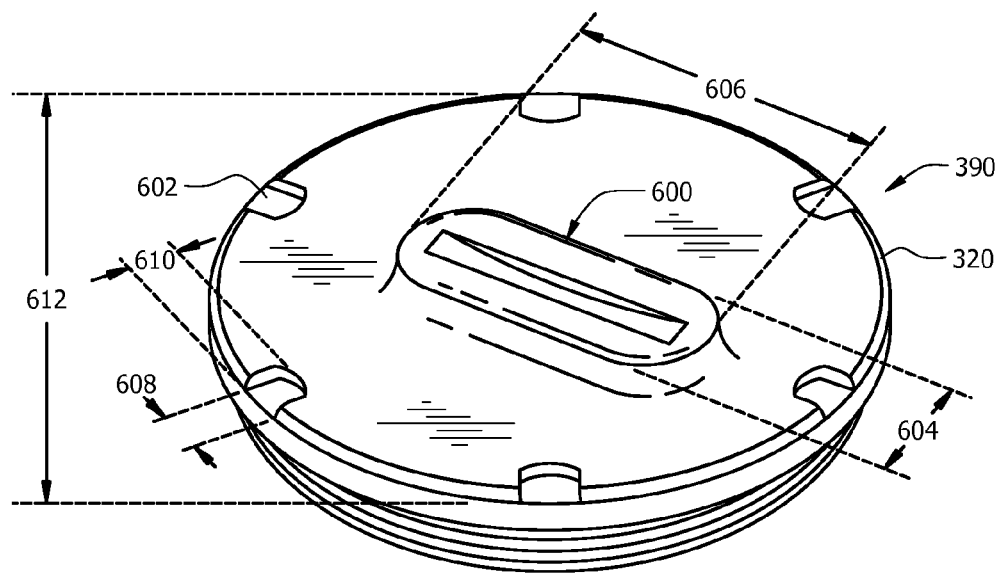
FIG. 6 is a perspective view of a top of a battery assembly that is useful for understanding the present invention.

Referring now to FIG. 6, there is provided a top perspective view of battery assembly 390 that is useful for understanding the present invention. As noted above, screw plate 320 is configured to facilitate an electrical connection between battery 318 (described above in relation to FIG. 3) and chassis 332 (described above in relation to FIG. 3) of electronic device 100 (described above in relation to FIG. 1). As such, screw plate 320 is formed of an electrically conductive material. Such electrically conductive materials include, but are not limited to, metal materials (e.g., brass with electroless nickel). Screw plate 320 can be formed utilizing any suitable process known to those having ordinary skill in the art. Such processes include, but are not limited to, molding processes, etching processes, and machining processes.

As shown in FIG. 6, screw plate 320 has a generally circular shape with a slot 600 and notches 602. The slot 600 is configured for facilitating an easy replacement of battery 318 (described above in relation to FIG. 3) using conventional rotational driving tools and/or coins. Such conventional tools include, but are not limited to, screw drivers and pocket knifes. The slot 600 can be formed in screw plate 320 using any suitable process, such as a machining process. The slot 600 can have a width 604, length 606, and depth (not shown) selected in accordance with a particular battery assembly 390 application.

The notches 602 provide a means for gripping the screw plate 320 so that the screw plate 320 can be driven by conventional rotational driving tools. Such tools include, but are not limited to, watch tool drivers. Although six notches 602 are shown in FIG. 6, the invention is not limited in this regard. Screw plate 320 can have any number of notches selected in accordance with a particular battery assembly 390 application. Notches 602 can have a width 608, length 610, and depth (not shown) selected in accordance with a particular battery assembly 390 application.

Figure 7:
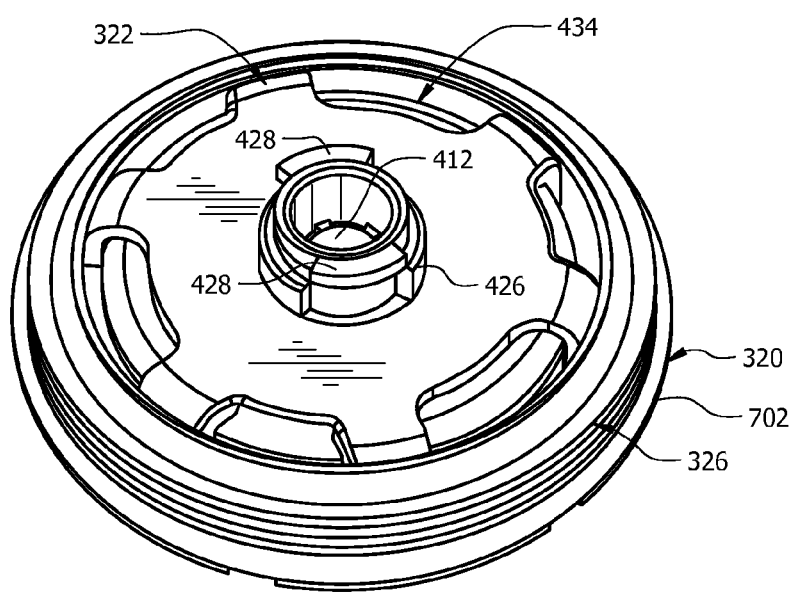
FIG. 7 is a perspective view of a bottom of a battery assembly that is useful for understanding the present invention.

Referring now to FIG. 7, there is provided a bottom perspective view of screw plate 320 with insulator cup 322 disposed within a recess 434 formed in screw plate 320. Recess 434 is formed by sidewall 326 and base member 702 of screw plate 320. Recess 434 is sized and shaped to receive insulator cup 322. As also shown in FIG. 7, the electrically conductive contact 412 of insulator cup 322 is disposed in bushing 426. The electrically conductive contact 412 facilitates an electrical connection between the battery 318 (described above in relation to FIG. 3) and electrically conductive pin 302.

Figure 8:
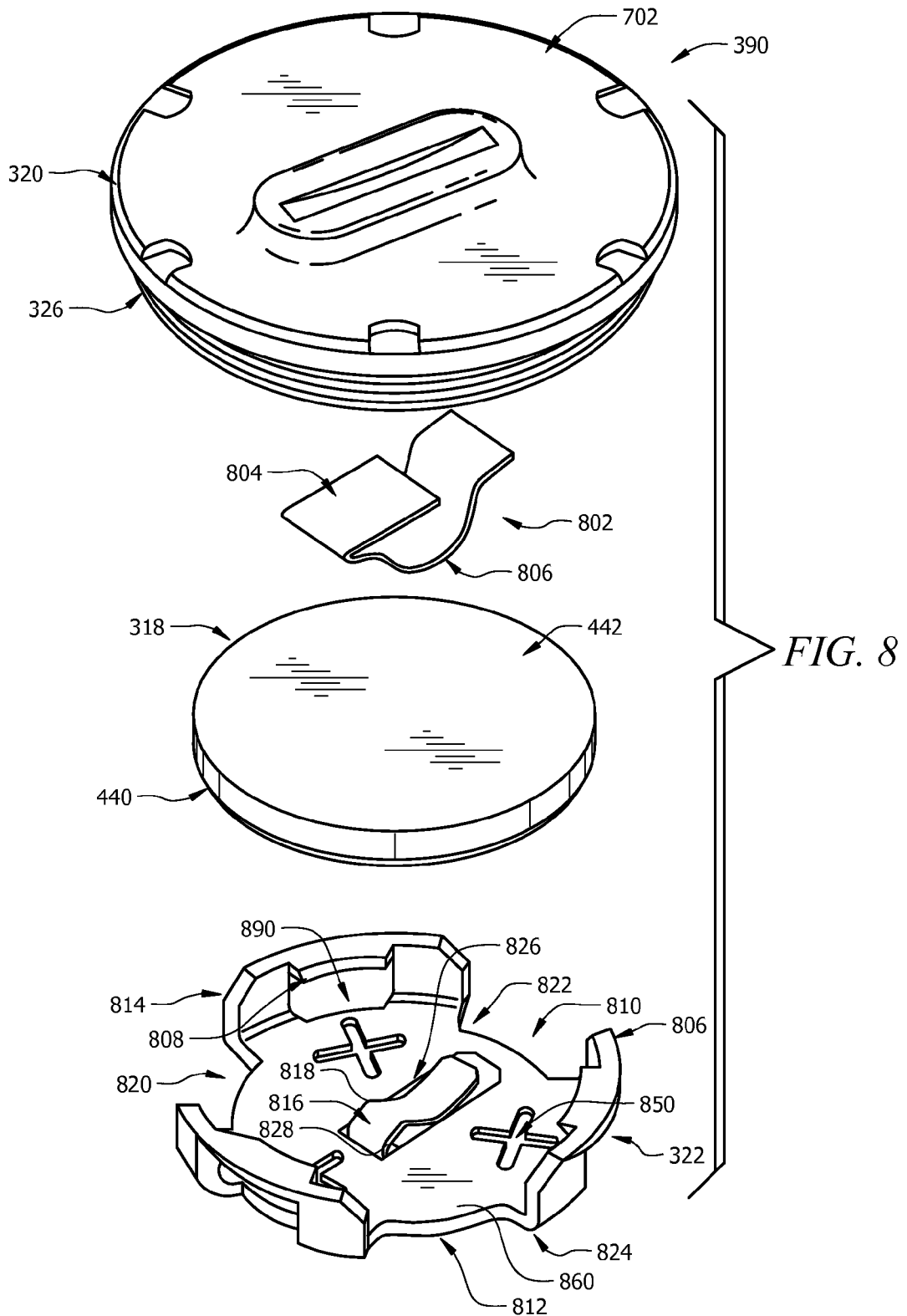
FIG. 8 is a first exploded perspective view of the battery assembly shown in FIGS. 6-7 that is useful for understanding the invention.
Figure 9:
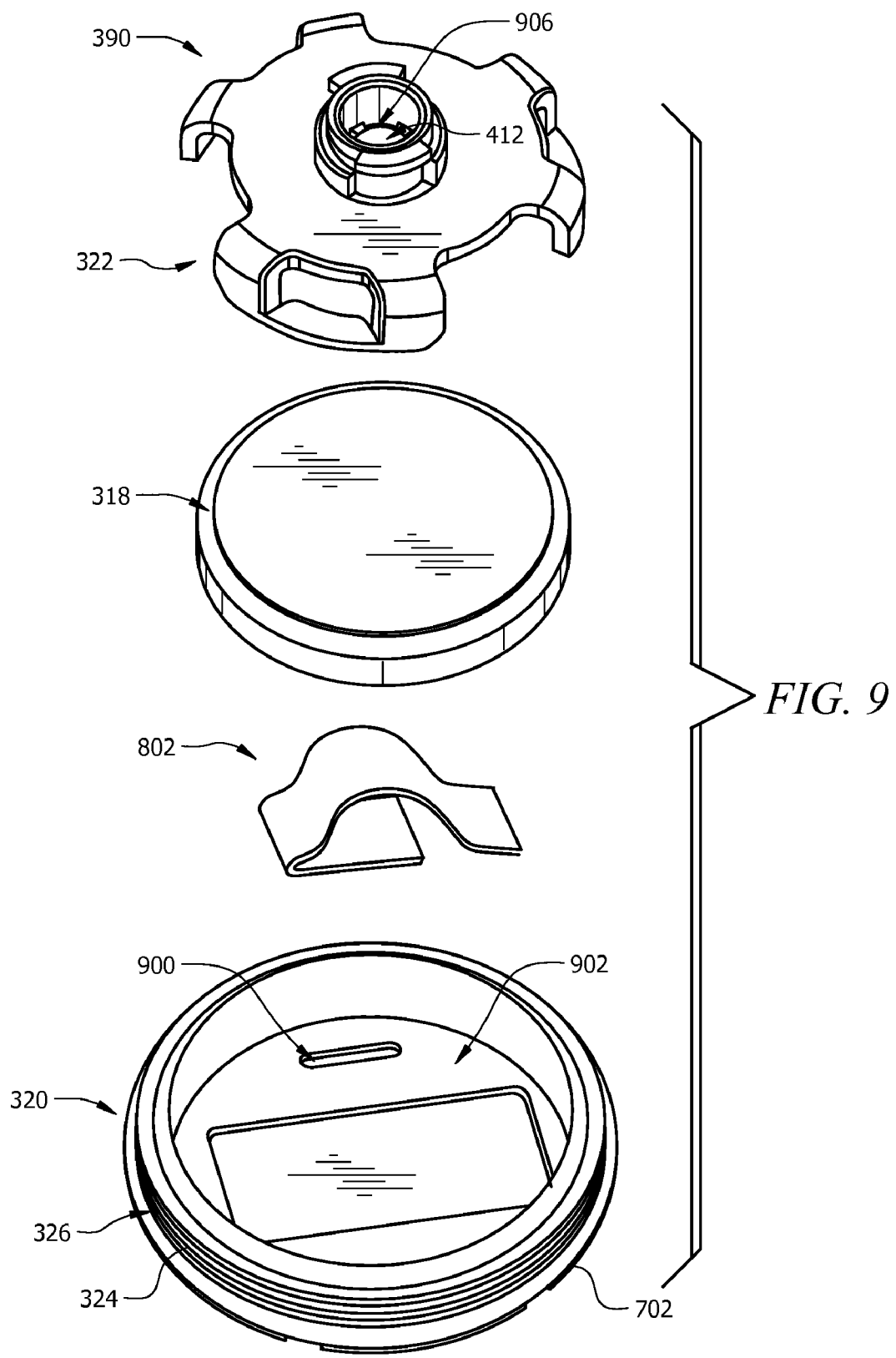
FIG. 9 is a second exploded perspective view of the battery assembly shown in FIGS. 6-7 that is useful for understanding the invention.

Referring now to FIGS. 8-9, there are provided exploded perspective views of battery assembly 390 that is useful for understanding the invention. As also shown in FIGS. 8-9, screw plate 320 comprises base member 702 and sidewall 326. Negative designators 900 are formed on an inner surface 902 of the base member 702. The negative designators 900 are provided to ensure that the battery 318 (described above in relation to FIG. 3) is placed in insulator cup 322 is a proper configuration. Screw plate 320 also comprises threads 324 formed on sidewall 326. The threads 324 are configured to threadingly engage a threaded surface 334 of cavity 210 (described above in relation to FIGS. 3-4). The threaded engagement facilitates the retention of screw plate 320 within cavity 210 (described above in relation to FIGS. 3-4) of electronic device 100.

As shown in FIGS. 8-9, a resilient conductive member 802 is provided. Resilient conductive member 802 is generally formed of an electrically conductive material capable of functioning as a spring and resisting corrosion under certain environmental conditions. Such electrically conductive materials include, but are not limited to, metal materials (such as a beryllium copper material). Resilient conductive member 802 can be formed using any suitable method known in the art. Such methods include a machining and bending process.

Resilient conductive member 802 facilitates the establishment of an electrical connection between battery 318 and screw plate 320. Resilient conductive member 802 is provided to account for size tolerance variations of the battery 318. Resilient conductive member 802 is configured to retain an electrical connection to battery 318 despite external forces (such as vibration). As such, resilient conductive member 802 has a cup-shaped member 806 with a flat flap 804. The cup-shaped member 806 is configured to engage a negative terminal 442 of battery 318. The flap 804 facilitates the coupling of the resilient conductive member 802 to screw plate 320. Flap 804 can be coupled to the inner surface 902 of screw plate 320 using any known electrically conductive coupling means. Such coupling means include, but are not limited to, electrically conductive adhesives and electrically conductive resins.

As shown in FIG. 8, the insulator cup 322 comprises positive designators 850 formed on a bottom surface 860 thereof. The positive designators 850 are provided to ensure that the battery 318 is placed in insulation member 322 is a proper configuration.

As shown in FIGS. 8-9, the insulator cup 322 comprises spaced apart sidewalls 806. The sidewalls 806 can be equally or non-equally spaced apart along a peripheral edge 812 of insulator cup 322. The sidewalls 806 extend away from a bottom surface 860 of the insulator cup 322. An insert space 890 is formed by the sidewalls 806 and a base 820. Although three (3) sidewalls 806 are shown in FIGS. 8-9, the invention is not limited in this regard. Insulator cup 322 can include any number of spaced apart sidewalls 806 selected in accordance with a particular battery assembly 390 application.

Each sidewall 806 includes a clip 808 protruding away from a top portion 814 of the respective sidewall 806. Clips 808 are designed to resiliently engage battery 318 when battery is inserted into insulator cup 322. The clips 808 removably retain battery 318 in insulator cup 322. In this regard, it should be noted that a space 810 is provided between each pair of sidewalls 806 to facilitate the removal of battery 318 from the insulator cup 322. Battery 318 can be removed from insulator cup 322 without using a tool.

Insulator cup 322 also comprises an electrically conductive contact 816 coupled thereto. Contact 816 is generally formed of an electrically conductive material capable of functioning as a spring and resisting corrosion under certain environmental conditions. Such electrically conductive materials include, but are not limited to, metal materials (such as a beryllium copper material). Contact 816 can be formed using any suitable method known in the art. Such methods include a machining and bending process.

Contact 816 facilitates the establishment of an electrical connection between the positive terminal 440 of battery 318 and electrically conductive pin 402 (described above in relation to FIG. 4). As such, contact 816 is a single electrically conductive element including a portion 826 located on a first side 822 of the insulator cup 322, a portion 828 passing through the insulator cup 322, and a portion 906 located on a second side 824 of the insulator cup 322.

Portion 826 of contact 816 is configured to retain an electrical connection to positive terminal 440 of battery 318 despite external forces (such as vibration). As such, portion 826 can be an S-shaped member 818 configured to act as a spring. The S-shaped member 818 projects inwardly from a bottom surface 860 of insulation member 322. The S-shaped member 818 is configured to engage the positive terminal 440 of battery 318. Portion 906 is coupled to the S-shaped member 818 via portion 828. Portion 906 comprises the electrically conductive contact 412 of the hold-up battery member 220 (described above in relation to FIGS. 3-4). As noted above, the electrically conductive contact 412 is configured to engage the electrically conductive pin 402 (described above in relation to FIG. 4) for providing an electrical connection between internal circuitry (not shown) of electronic device 100 and battery 318.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

We claim:

1. A battery holder assembly for an electronic device, comprising:

a cavity structure disposed in a chassis panel of an electronic device, said cavity structure defining a cavity and at least partially formed of an electrically conductive material;

a screw plate at least partially formed of an electrically conductive material sized and shaped to be snugly fitted within an opening in said chassis panel defined by said cavity structure, said screw plate having a base which forms a cover for enclosing said cavity and is configured to form an electrical connection with said cavity structure and a first terminal of a coin cell battery, when said coin cell battery is positioned in said cavity and said screw plate is fitted within said opening;

a spring electrical contact disposed on an inner face of said screw plate configured for providing an electrical connection between said coin cell battery disposed in said cavity and an inner face of said screw plate;

an insulator cup formed of an electrically insulating material, said insulator cup sized and shaped for snugly receiving a coin cell battery therein, and configured to fit within said cavity and electrically insulate a second battery terminal of a coin cell battery when positioned therein from said cavity structure;

a battery contact formed of an electrically conductive material disposed on said insulator cup configured for providing an electrical connection to a second terminal of a coin cell battery when said coin cell battery is positioned in said cavity;

an aperture formed in said cavity structure opposed from said screw plate; and a pin formed of a conductive material and forming an electrical connection extending between said battery contact on said insulator cup and a circuit board of said electronic device.

2. The battery holder assembly according to claim 1, wherein said pin is comprised of a pogo pin having at least one movable end which is resiliently biased for movement in a direction aligned with an axis of said pin.

3. The battery holder assembly according to claim 2, wherein said movable end of said pin is configured to resiliently engage said battery contact on said insulator cup when said circuit board is secured adjacent to said chassis panel.

4. The battery holder assembly according to claim 1, wherein said pin extends at least partially through said aperture to form said electrical connection with said battery contact.

5. The battery holder assembly according to claim 1, wherein said screw plate is comprised of a peripheral side wall with threads disposed thereon configured for threaded engagement with a threaded side wall of said cavity structure.

6. The battery holder assembly according to claim 5, further comprising a gasket disposed within said cavity structure and positioned to engage an edge of said peripheral side wall opposed from said base.

7. The battery holder assembly according to claim 1, wherein said cavity structure has a cylindrical shape.

8. The battery holder assembly according to claim 1, wherein said insulator cup is comprised of one or more clips integrally formed with said insulator cup and configured for securing a coin cell battery in said insulator cup when positioned therein.

9. The battery holder assembly according to claim 1, wherein said insulator cup is secured within said cavity.

10. The battery holder assembly according to claim 1, wherein said insulator cup is further comprised of a bushing which projects from a base thereof, said bushing extending through said aperture, and having a bore defined therein configured for receiving said pin.

11. The battery holder assembly according to claim 10, further comprising a flange disposed on said bushing, said flange configured for engaging a securing clip configured to secure said insulator cup in said cavity structure.

12. The battery holder assembly according to claim 1, further comprising a gasket disposed in a portion of said cavity structure, said gasket providing a seal between said screw plate and said cavity structure configured for excluding the entry of environmental contaminants through said cavity and into said electronic device.

13. The battery holder assembly according to claim 1, further comprising at least one slot or notch disposed on a surface of said screw plate for receiving a tool.

14. A battery holder assembly for an electronic device, comprising:

a cavity structure disposed in a chassis panel of an electronic device, said cavity structure defining a cavity and at least partially formed of an electrically conductive material;

a screw plate at least partially formed of an electrically conductive material sized and shaped to be snugly fitted within an opening in said chassis panel defined by said cavity structure, said screw plate having a base which forms a cover for enclosing said cavity and is configured to form an electrical connection with said cavity structure and a first terminal of a coin cell battery, when said coin cell battery is positioned in said cavity and said screw plate is fitted within said opening;

an insulator cup formed of an electrically insulating material, said insulator cup sized and shaped for snugly receiving a coin cell battery therein, and configured to fit within said cavity and electrically insulate a second battery terminal of a coin cell battery when positioned therein from said cavity structure;

a battery contact formed of an electrically conductive material disposed on said insulator cup configured for providing an electrical connection to a second terminal of a coin cell battery when said coin cell battery is positioned in said cavity;

an aperture formed in said cavity structure opposed from said base of said screw plate; and a pin formed of a conductive material and forming an electrical connection between said battery contact on said insulator cup and a circuit board of said electronic device.

15. A battery holder assembly for an electronic device, comprising:

a cavity structure disposed in a chassis panel of an electronic device, said cavity structure defining a cavity and at least partially formed of an electrically conductive material;

a screw plate at least partially formed of an electrically conductive material sized and shaped to be snugly fitted within an opening in said chassis panel defined by said cavity structure, said screw plate having a base which forms a cover for enclosing said cavity and is configured to form an electrical connection with said cavity structure and a first terminal of a coin cell battery, when said coin cell battery is positioned in said cavity and said screw plate is fitted within said opening;

an insulator cup formed of an electrically insulating material, said insulator cup sized and shaped for snugly receiving a coin cell battery therein, and configured to fit within said cavity and electrically insulate a second battery terminal of a coin cell battery when positioned therein from said cavity structure;

a battery contact formed of an electrically conductive material disposed on said insulator cup configured for providing an electrical connection to a second terminal of a coin cell battery when said coin cell battery is positioned in said cavity;

an aperture formed in said cavity structure opposed from said base of said screw plate;

a pogo pin formed of a conductive material and forming an electrical connection between said battery contact on said insulator cup and a circuit board of said electronic device, said pogo pin having at least one movable end which is resiliently biased for movement in a direction aligned with an axis of said pin, wherein said movable end of said pin is configured to resiliently engage said battery contact on said insulator cup when said circuit board is secured to said chassis panel.

16. The battery holder assembly according to claim 15, wherein said screw plate is comprised of a peripheral side wall extending transversely from said base with threads disposed thereon configured for threaded engagement with a threaded side wall of said cavity structure.

17. The battery holder assembly according to claim 16, further comprising a gasket disposed within said cavity structure and positioned to engage an edge of said peripheral side wall opposed from said base.

18. The battery holder assembly according to claim 15, wherein said insulator cup is comprised of one or more clips integrally formed with said insulator cup and configured for securing a coin cell battery in said insulator cup when positioned therein.

19. The battery holder assembly according to claim 15, wherein said insulator cup is secured within said cavity.

20. The battery holder assembly according to claim 15, wherein said insulator cup is further comprised of a bushing which projects from a base thereof, said bushing extending through said aperture, and having a bore defined therein configured for receiving said pin.

21. A battery holder assembly for an electronic device, comprising:
a cavity structure defining a cavity and at least partially formed of an electrically conductive material;
a screw plate at least partially formed of an electrically conductive material sized and shaped to be snugly fitted within an opening defined by said cavity structure, said screw plate having a base which forms a cover for enclosing said cavity and is configured to form an electrical connection with said cavity structure and a first terminal of a coin cell battery, when said battery is positioned in said cavity and said screw plate is fitted within said opening;
an insulator cup formed of an electrically insulating material, said insulator cup sized and shaped for snugly receiving a coin cell therein, and configured to fit within said cavity and electrically insulate a second battery terminal of a coin cell battery when positioned therein from said cavity structure;
a battery contact formed of an electrically conductive material disposed on said insulator cup configured for providing an electrical connection to a second terminal of a coin cell battery when said coin cell battery is positioned in said cavity;
an aperture formed in said cavity structure opposed from said base of said screw plate; and
a pogo pin formed of a conductive material and forming an electrical connection between said battery contact on said insulator cup and a circuit board of an electronic device when said cavity structure is positioned on a panel of an electronic device, said pogo pin having at least one movable end which is resiliently biased for movement in a direction aligned with an axis of said pin, and wherein said movable end of said pin is configured to resiliently engage said battery contact on said insulator cup when said circuit board is secured adjacent to said chassis panel.

22. A battery packaging system configured for being coupled to an electronic device so as to facilitate an electrical connection between a battery and an internal circuit of said electronic device, comprising:
an electrically conductive screw plate comprising a base member, a sidewall, and a recess defined by said sidewall and said base member, said electrically conductive screw plate configured for being mechanically and electrically connected to a chassis of said electronic device;
an electrical spring contact disposed within said recess and coupled to said base member, said electrical spring contact configured for providing an electrical connection between said electrically conductive screw plate and a first terminal of said battery;
an insulator cup configured for receiving said battery and insulating at least a portion of said battery from said electrically conductive screw plate and said chassis said insulator cup comprising a base, a plurality of sidewalls protrusions extending away from said base, and an insert space formed by said base and said plurality of sidewalls protrusions; and
an electrically conductive contact coupled to said insulator cup and configured for facilitating an electrical connection between a second terminal of said battery and said internal circuit.

23. A battery packaging system configured for being coupled to an electronic device so as to facilitate an electrical connection between a battery and an internal circuit of said electronic device, comprising:
an electrically conductive screw plate comprising a base member, a sidewall, and a recess defined by said sidewall and said base member, said electrically conductive screw plate configured for being mechanically and electrically connected to a chassis of said electronic device;
an electrical spring contact disposed within said recess and coupled to said base member, said electrical spring contact configured for providing an electrical connection between said electrically conductive screw plate and a first terminal of said battery;
an insulator cup configured for receiving said battery and insulating at least a portion of said battery from said electrically conductive screw plate and said chassis, said insulator cup comprising a base, a plurality of sidewall protrusions extending away from said base, and an insert space formed by said base and said plurality of sidewall protrusions, each of said sidewall protrusions comprising a first opposing end coupled to said base and a second opposing end having a clip extending outwardly therefrom, said clip configured for resiliently engaging said battery when said battery is inserted into said insert space; and
an electrically conductive contact coupled to said insulator cup and configured for facilitating an electrical connection between a second terminal of said battery and said internal circuit.

* * * * *